(12) United States Patent
Birk et al.

(10) Patent No.: US 10,101,203 B2
(45) Date of Patent: Oct. 16, 2018

(54) DEVICE AND METHOD FOR DETECTING LIGHT

(75) Inventors: Holger Birk, Meckesheim (DE); Volker Seyfried, Nussloch (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 553 days.

(21) Appl. No.: 13/545,999

(22) Filed: Jul. 11, 2012

(65) Prior Publication Data

US 2013/0015331 A1    Jan. 17, 2013

(30) Foreign Application Priority Data

Jul. 12, 2011    (DE) .................. 10 2011 107 645

(51) Int. Cl.

| | |
|---|---|
| *G01J 3/02* | (2006.01) |
| *G01J 1/02* | (2006.01) |
| *G01J 1/18* | (2006.01) |
| *G01J 1/44* | (2006.01) |
| *G01J 3/28* | (2006.01) |
| *G01J 3/36* | (2006.01) |

(52) U.S. Cl.
CPC ............ *G01J 3/027* (2013.01); *G01J 1/0228* (2013.01); *G01J 1/18* (2013.01); *G01J 1/44* (2013.01); *G01J 3/2803* (2013.01); *G01J 3/36* (2013.01)

(58) Field of Classification Search
CPC .... G01J 1/44; G01J 3/36; G01J 1/0228; G01J 1/18; G01J 3/027; G01J 3/42; G01J 3/44; G01J 3/4412; G01J 3/4406
USPC ......... 250/207, 214 VT, 208.1, 458.1, 459.1, 250/461.1, 461.2; 327/514, 515; 313/527, 528, 532; 356/237.2, 300, 301, 356/302, 319, 320, 326, 342, 343; 257/431, 432, 437, 438

See application file for complete search history.

(56) References Cited

U.S. PATENT DOCUMENTS

| | | | |
|---|---|---|---|
| 6,335,523 B1* | 1/2002 | Idesawa ............ H01L 31/02024 | |
| | | | 250/214.1 |
| 6,995,841 B2* | 2/2006 | Scott et al. .................... 356/318 |
| 7,760,335 B2 | 7/2010 | Wolf et al. | |
| 8,193,815 B2* | 6/2012 | Prescher et al. .............. 324/501 |
| 8,582,098 B2* | 11/2013 | Tsupryk et al. ............... 356/317 |
| 2007/0182949 A1 | 8/2007 | Niclass | |
| 2008/0180661 A1* | 7/2008 | Brown et al. ................. 356/301 |
| 2010/0214654 A1 | 8/2010 | Birk et al. | |
| 2012/0248347 A1* | 10/2012 | Renna et al. ................. 250/573 |

FOREIGN PATENT DOCUMENTS

DE    102006013290 A1    9/2007

OTHER PUBLICATIONS

Frach T et al: "The digital silicon photomultiplier a principle of operation an intrinsic detector performance", Dec. 2009 IEEE Nuclear Science Symposium and Medical imaging Conference.

* cited by examiner

*Primary Examiner* — Georgia Y Epps
*Assistant Examiner* — Don Williams
(74) *Attorney, Agent, or Firm* — Leydig, Voit & Mayer, Ltd.

(57) ABSTRACT

A device for detecting light includes at least one silicon photomultiplier (SiPM) having an array of a plurality of single-photon avalanche diodes (SPADs), the array being larger in area than an incident light. The device is configured so as to at least one of activate and analyze only the SPADs upon which a specific minimum intensity of light impinges.

21 Claims, 16 Drawing Sheets light distribution

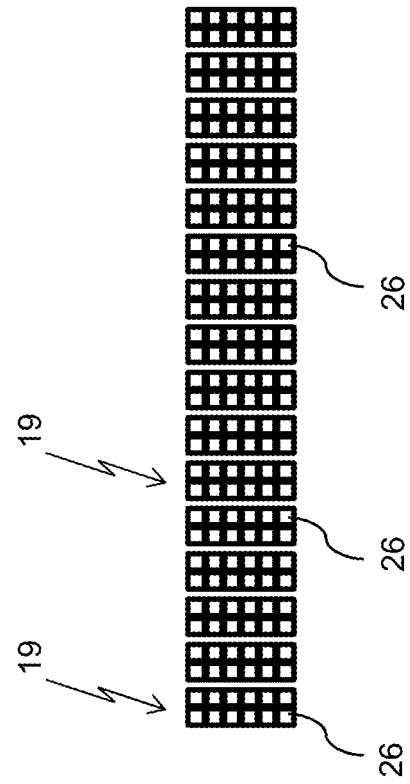
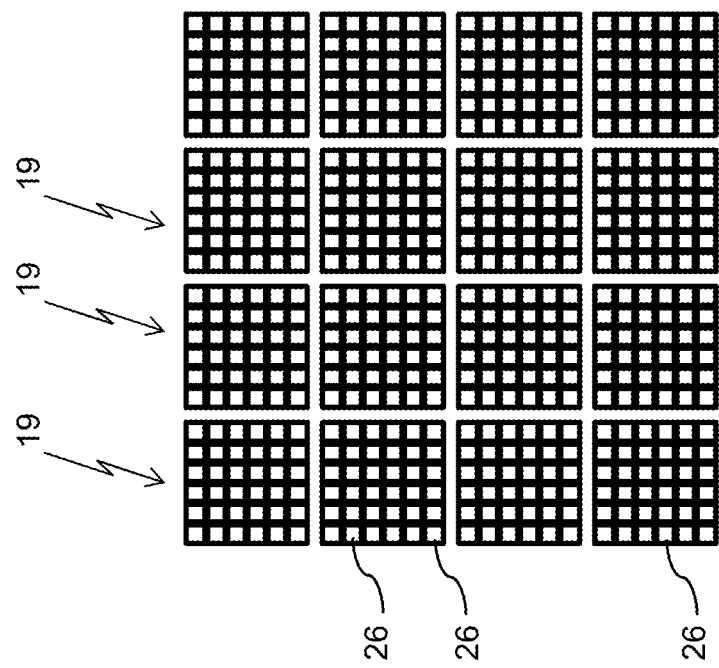
Fig. 4b
Fig. 4a

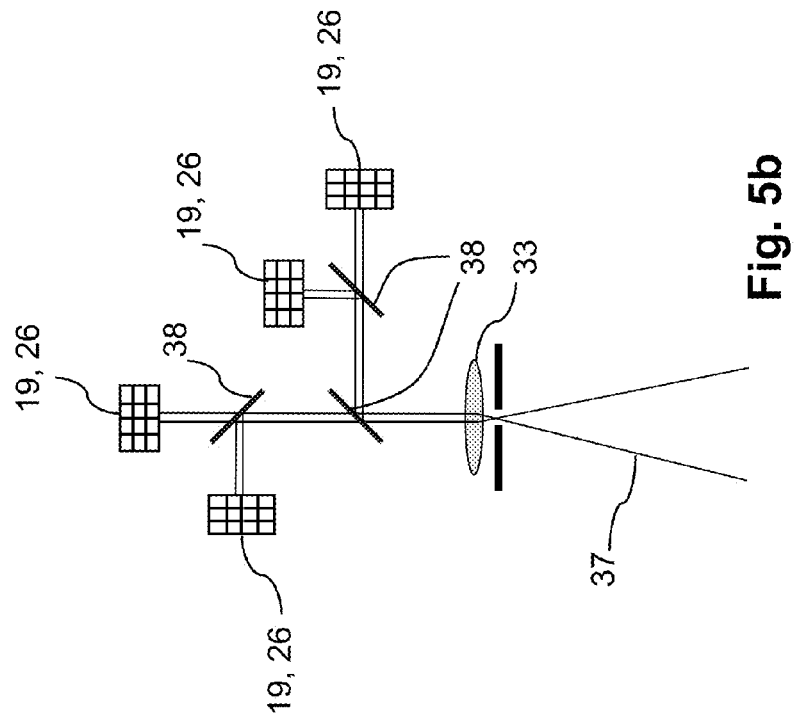
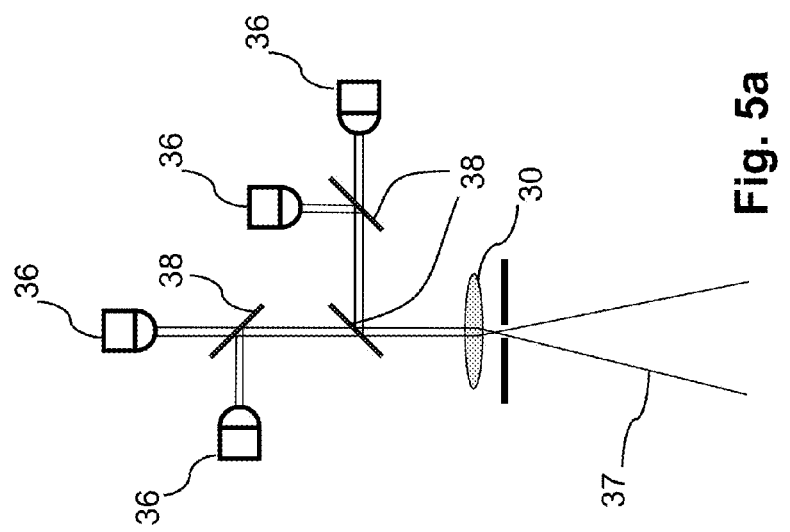

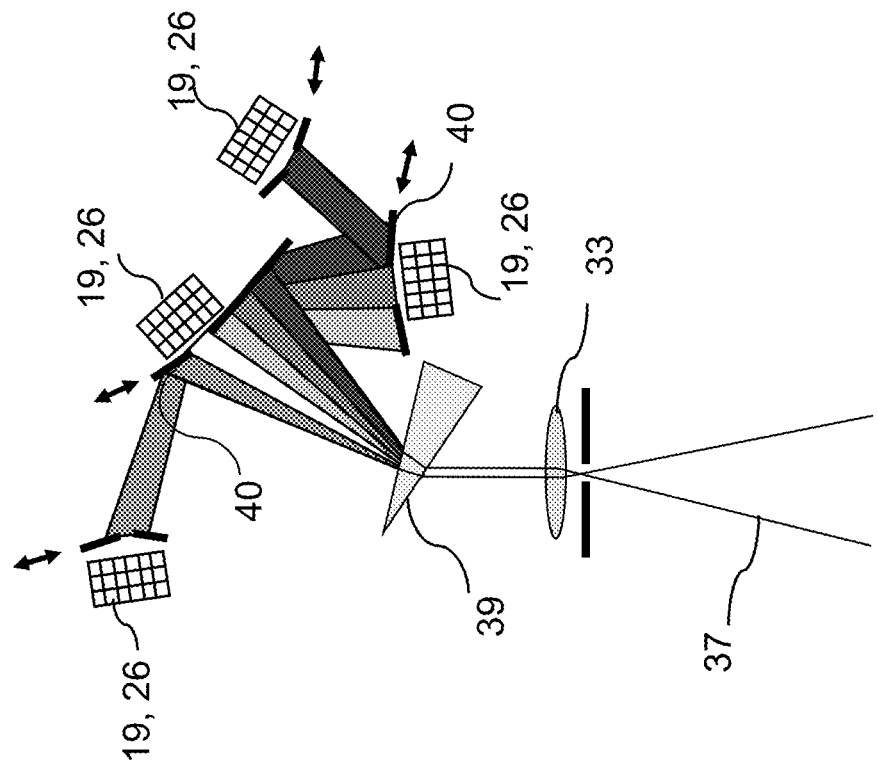
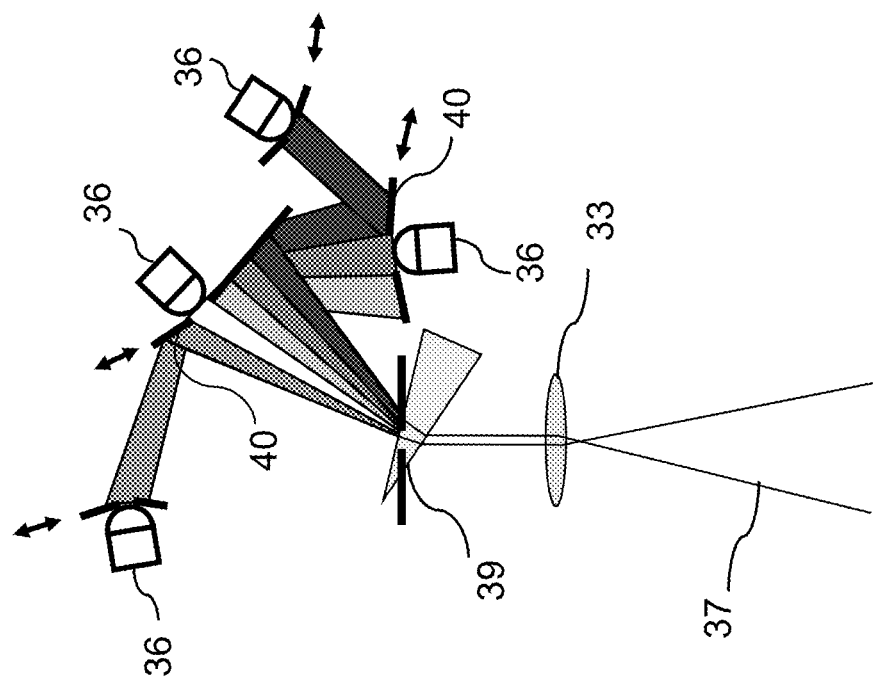

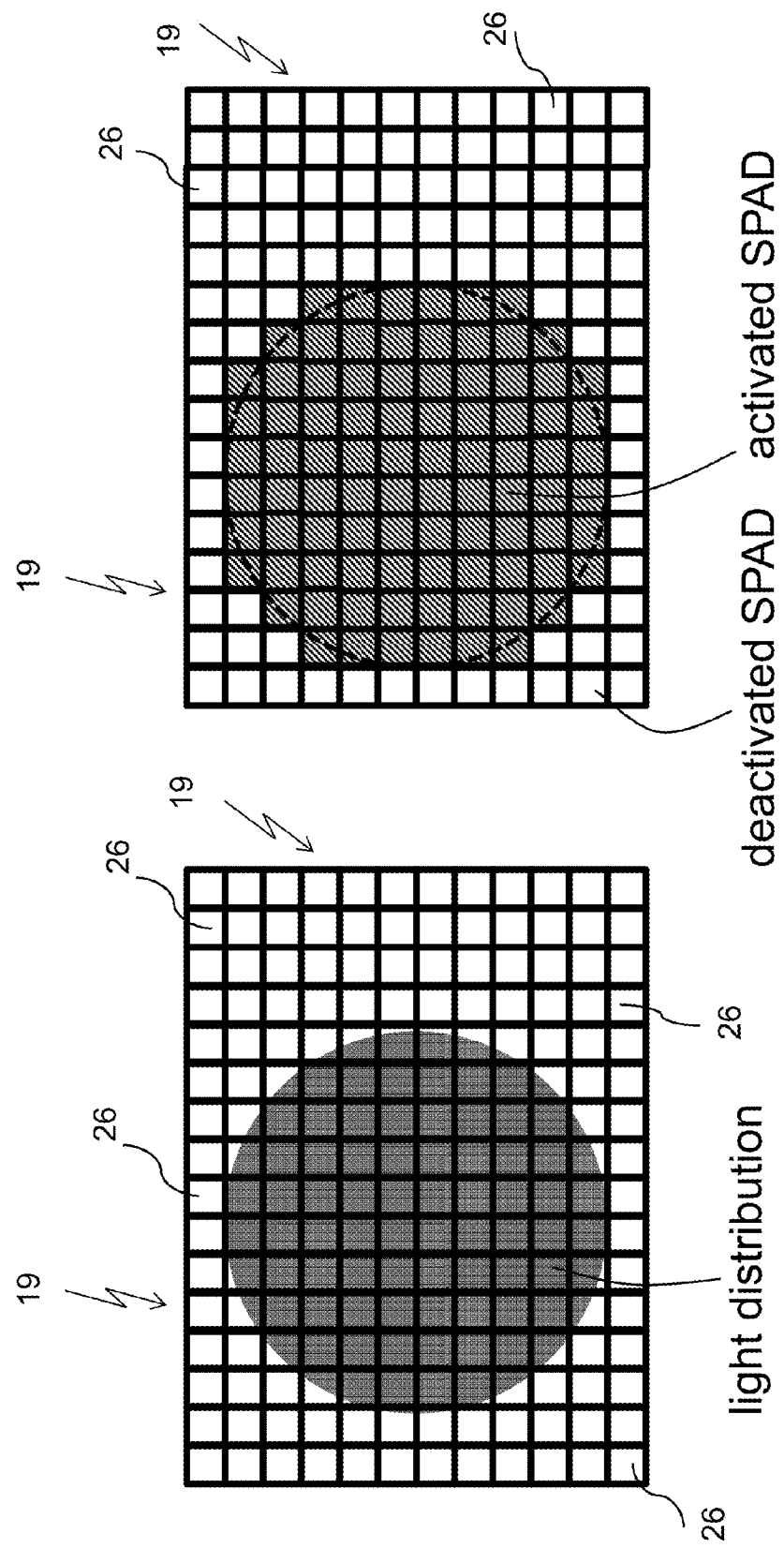

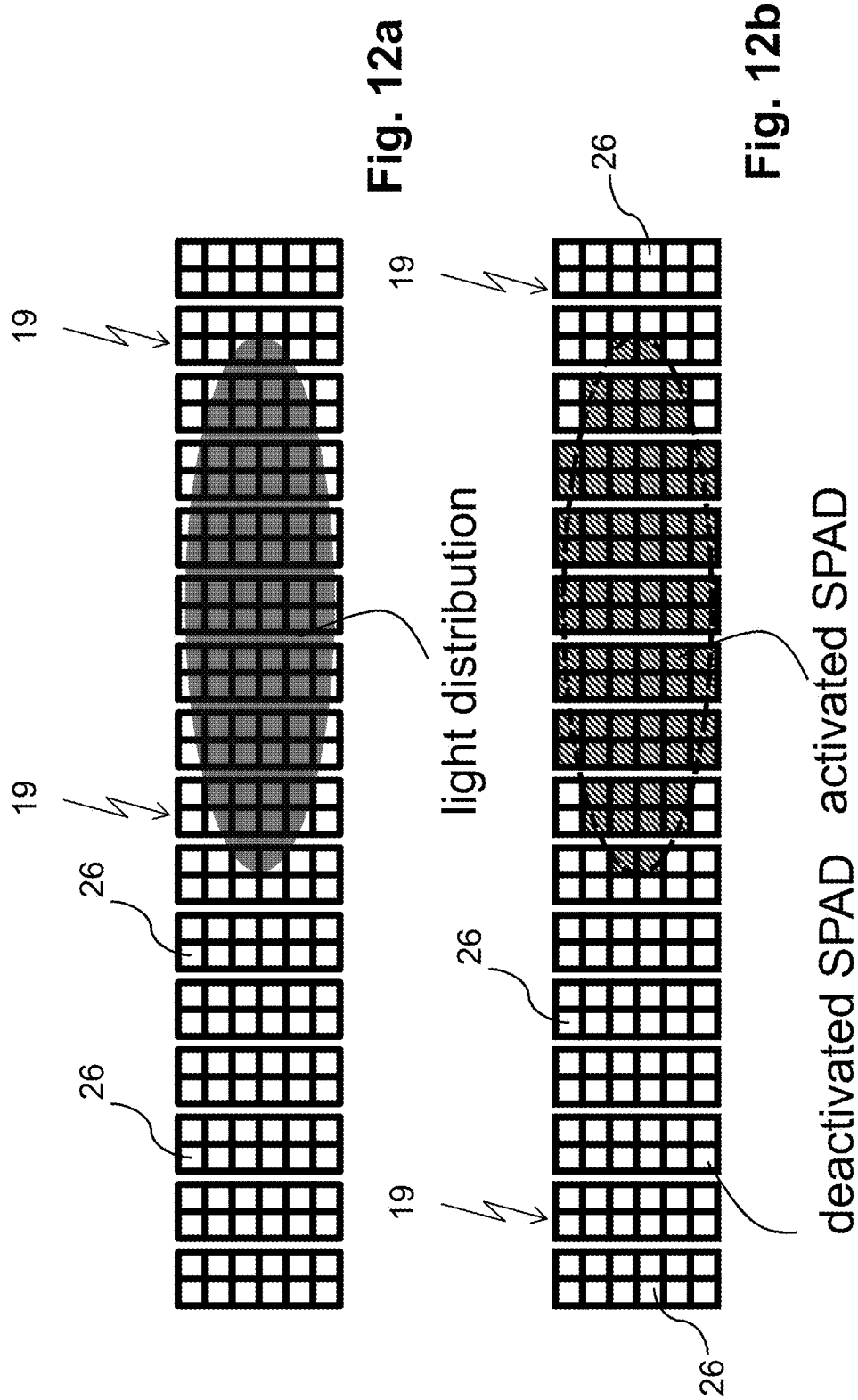

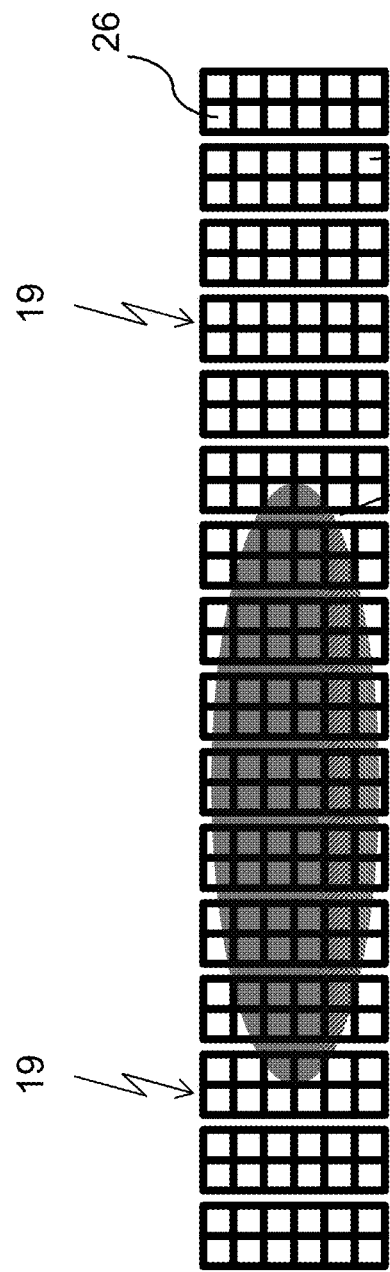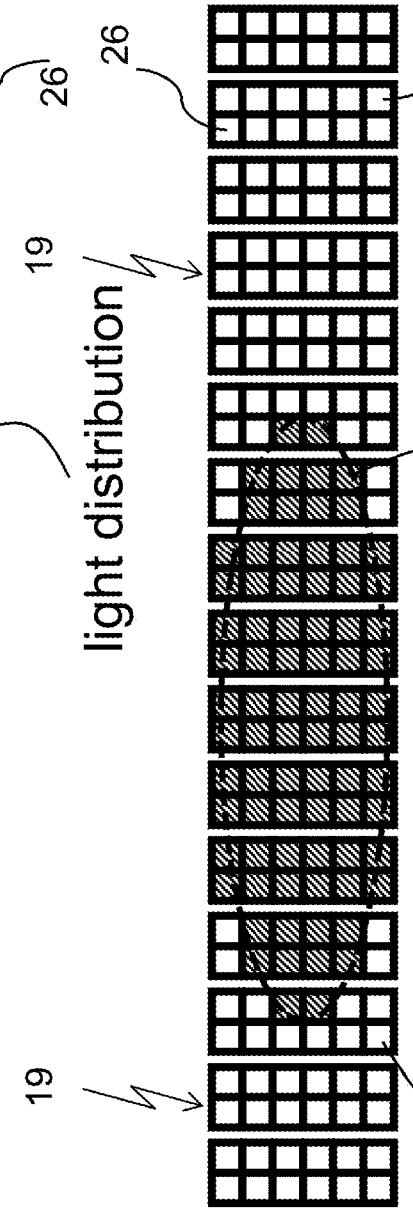
Fig. 13a
Fig. 13b

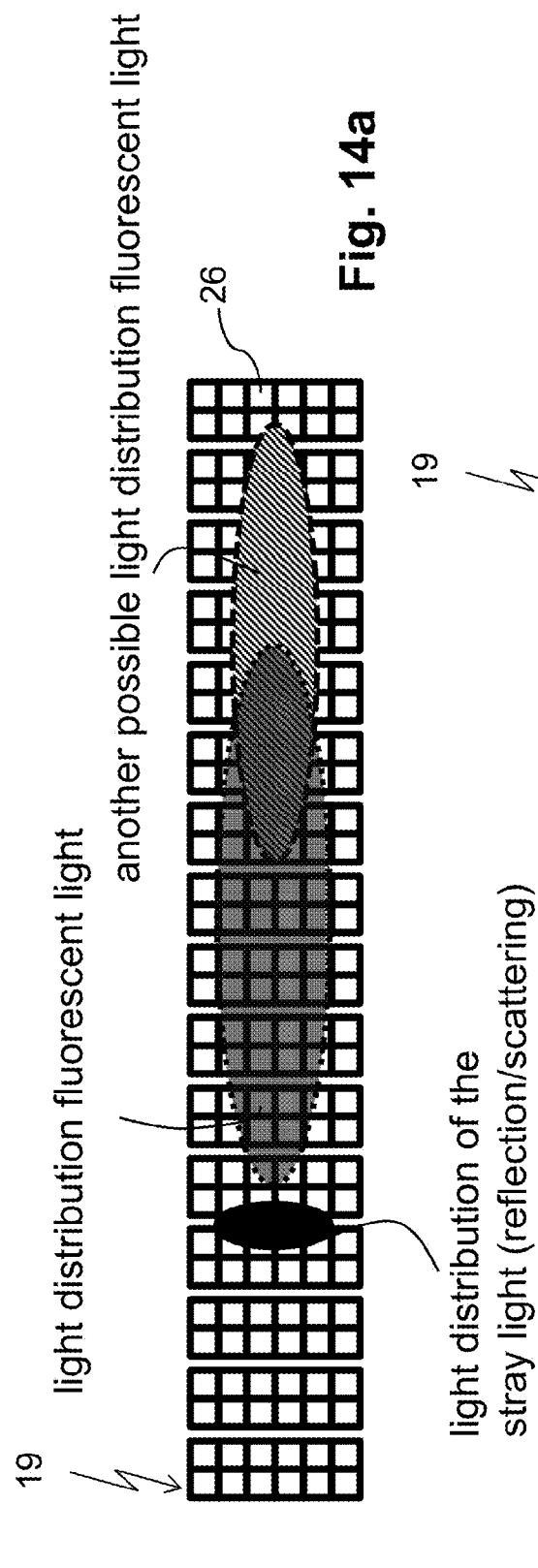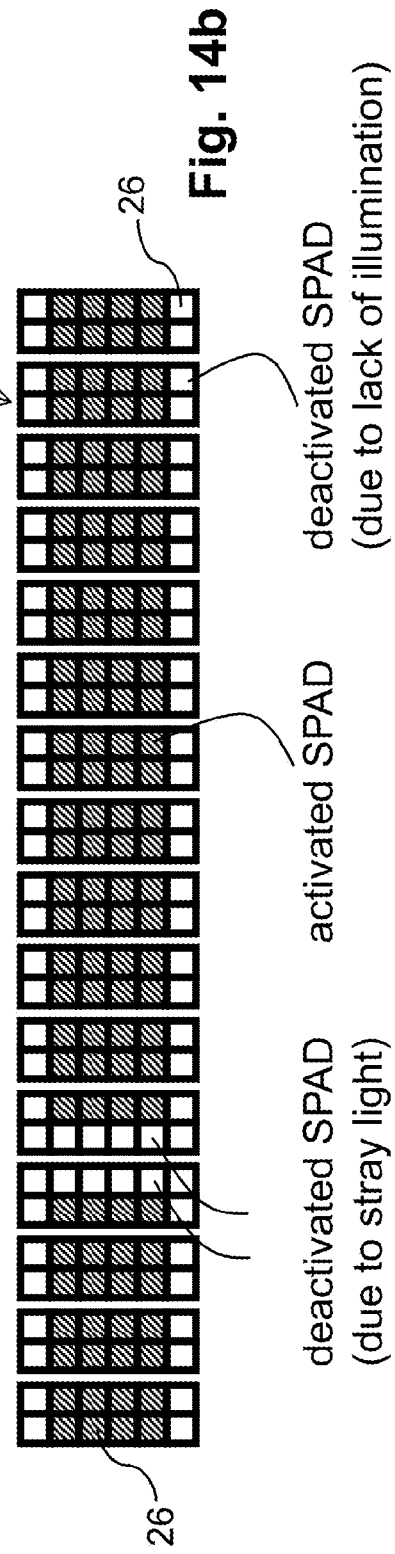
Fig. 14a
Fig. 14b

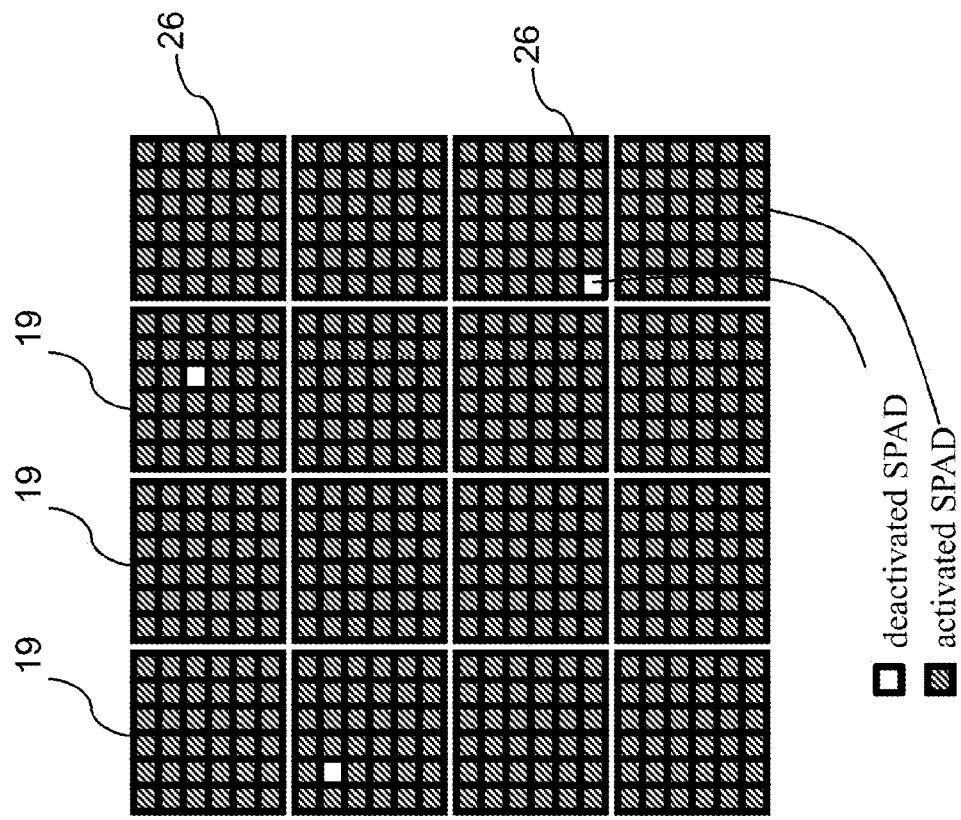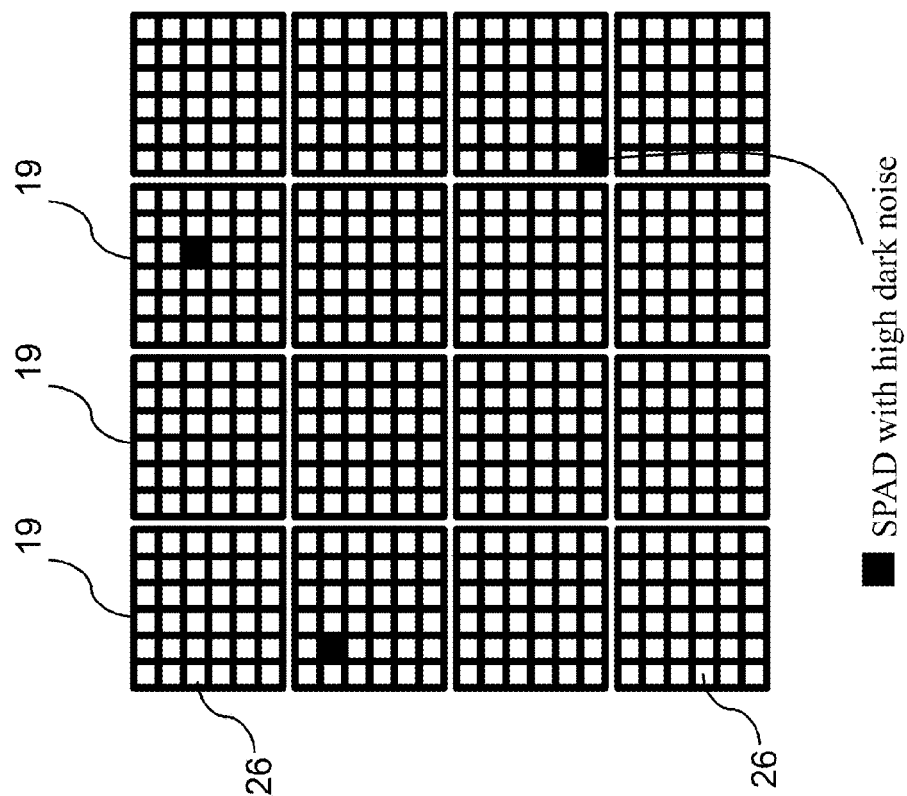
Fig. 15

US 10,101,203 B2

DEVICE AND METHOD FOR DETECTING LIGHT

CROSS REFERENCE TO RELATED APPLICATIONS

This application claims priority to German Patent Application No. DE 10 2011 107 645.3, filed Jul. 12, 2011, which is hereby incorporated by reference herein in its entirety.

FIELD

The present invention relates to a device for detecting light, in particular, for use in a microscope, a spectrometer, or a camera and a method that is preferably carried out using the device.

BACKGROUND

Photomultipliers (PMT) have been known in the field for many years, these being special electron tubes whose task is to detect weak light signals down to single photons by generating and amplifying an electrical signal. A photomultiplier is typically composed of a photocathode and a downstream secondary electron multiplier, configured in an evacuated glass bulb. Since the photomultiplier is a vacuum tube, it is relatively large in size and is, therefore, not suited for miniaturization.

Avalanche photodiodes (APD) are also known in the field, these being highly sensitive and fast photodiodes. They exploit the internal photoelectric effect to generate charge carriers and the avalanche breakdown (avalanche effect) for internal amplification. APDs are regarded as the semiconductor equivalent of photomultipliers and are used, inter alia, in the detection of very low optical power levels and have cut-off frequencies up to the gigahertz range.

For photon counting, APDs are operated in Geiger mode, single-photon avalanche diodes (SPADs) generally being referred to in this context. More recent developments include silicon photomultipliers (SiPM), where a plurality of SPADs are combined in analog or digital fashion to form a larger detection area. Reference is made in this regard merely exemplarily to U.S. Patent Application 2010/0214654 A1, which is hereby incorporated by reference herein in its entirety.

An important consideration in the selection of detection systems is generally a highest possible photon detection efficiency (PDE), a lowest possible dark noise level (caused by what is generally referred to as dark current of individual light-sensitive elements), and a highest possible, respectively maximum photon rate, i.e., a high dynamic response of the detector.

Photomultiplier tubes have a costlier design than detectors fabricated using Si technology. Moreover, photomultipliers generally have a lower photon detection efficiency than avalanche photodiodes, for example. In all types of detectors, the dark noise depends to a significant degree on the total detection area, the quality of the photocathode material, as well as on the operating temperature of the detector.

SUMMARY

In an embodiment, the present invention provides device for detecting light that includes at least one silicon photomultiplier (SiPM) having an array of a plurality of single-photon avalanche diodes (SPADs), the array being larger in area than an incident light. The device being configured so as to at least one of activate and analyze only the SPADs upon which a specific minimum intensity of light impinges.

BRIEF DESCRIPTION OF THE DRAWINGS

Exemplary embodiments of the present invention are described in more detail below with reference to the drawings, in which:

FIG. 4 shows schematic views of arrays of a plurality of SiPMs as multipixel SiPMs, for example, for use in a camera (FIG. 4a) or in a spectrometer (FIG. 4b);

FIG. 5 shows schematic views of the use of SPAD arrays as a replacement for conventional photomultipliers;

FIG. 8: shows schematic views of the use of SPAD arrays as a replacement for conventional photomultipliers when working with what are known as SP detectors having a variable aperture;

FIG. 10 shows schematic views of the light distribution (FIG. 10a) and the activation/deactivation of individual SPADs (FIG. 10b);

FIG. 12 shows a schematic view of the basic configuration of an array of SiPMs, FIG. 12a illustrating the light distribution, and FIG. 12b the activation/deactivation of individual SPADs;

FIG. 13 shows a schematic view of the basic configuration of an array of SiPMs, FIG. 13a illustrating the light distribution, and FIG. 13b the activation/deactivation of individual SPADs, however, for a different wavelength;

FIG. 14 shows a schematic view of the light distribution (FIG. 14a) and the activation/deactivation of individual SPADs (FIG. 14b), the SiPMs being linearly arrayed;

FIG. 15 shows a schematic view of the matrix-type array of a plurality of SiPMs having integrated SPADs, SPADs therein having high dark noise levels being deactivated;

DETAILED DESCRIPTION

Figure 1:
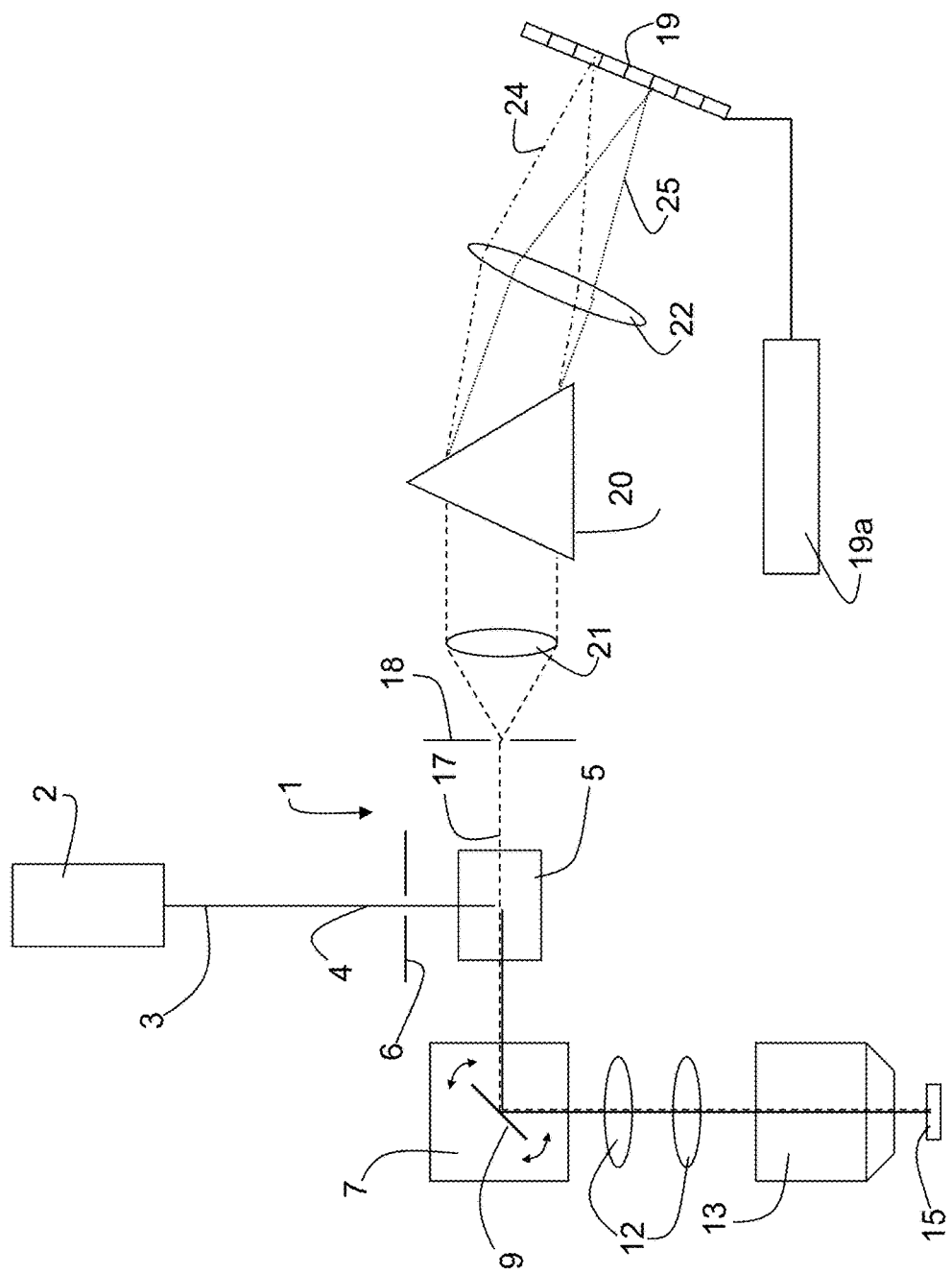
FIG. 1 shows a schematic view of the basic configuration of a confocal microscope including the essential components, a device according to the present invention being designed as a detector array.

The present invention generally relates to the detection of light, for example, for use in a microscope, a spectrometer, or a camera. The device is not limited to a particular application. In the broadest sense, it is to be understood as a detector for light.

In an embodiment the present invention provides a device for detecting light and a corresponding method, whereby a high image quality, respectively a high signal-to-noise ratio may be achieved at a given illumination/light intensity. It is intended that the device be small in size and inexpensive to manufacture. It is also intended to provide microscopes, spectrometers and cameras that are equipped accordingly.

In accordance with an embodiment of the present invention, the device for detecting light, in particular in a microscope, a spectrometer, or a camera, is equipped with at least one silicon photomultiplier (SiPM). The silicon photomultiplier is composed of an array of a plurality of single-photon avalanche diodes (SPADs). Of particular importance in this embodiment is that the array be larger in area than the incident light, only those SPADs being activated and/or analyzed upon which a specific—high—minimum intensity of light also actually impinges or strikes.

In accordance with an embodiment of the present invention, the device includes a specially adapted SiPM, the SiPM design featuring a high photon detection efficiency (PDE), namely, as in the case of single-photon avalanche diodes (SPADs). The response of one single pixel is derived from the number of SPADs combined per pixel, as well as from the dead time of one single SPAD. The dead time may be kept very short by "active quenching," namely within the range of >100 SPAD per pixel and <50 ns dead time.

The SiPMs used here allow selective activation, respectively deactivation of individual SPADs of one pixel. An SiPM having digital evaluation electronics is suited for this, in particular. Thus, an addressable static memory may be used for—selectively—activating individual SPADs directly on a chip.

Moreover, it is especially advantageous that SiPMs be able to be manufactured using a conventional CMOS process. Accordingly, such silicon photomultipliers are extremely rugged, particularly under conditions of optical power levels that are high or too high.

The device according to an embodiment of the present invention advantageously includes a plurality of silicon photomultipliers, each composed of an array of a plurality of single-photon avalanche diodes (SPADs). The plurality of SiPMs may be arranged in a matrix, for example, for use in a camera, or linearly side-by-side, for example, for use in a spectrometer. In accordance with the teaching of the present invention, the array of the SiPMs is altogether larger in area than the incident light, only those SPADs of the various SiPMs being activated and/or analyzed within the array which are impinged upon, respectively illuminated by a specific—high—minimum intensity of light.

It is advantageous for the device to be able to include a single silicon photomultiplier having an array of SPADs or an array of a plurality of SiPMs, each having an array of SPADs.

The minimum intensity of light may be ascertained from one or a plurality of test measurements, respectively from a calibration, at a defined system setting in each case.

An advantageous aspect of embodiments of the present invention involve minimizing the dark noise of the device, respectively of a correspondingly designed detector, in that only those SPADs are activated which contribute to a high signal-to-noise ratio. Therefore, only those SPADs, respectively pixels are activated upon which detection light is also actually expected. Accordingly, it is also only these—activated—SPADs which contribute to the dark noise.

Moreover—independently of the complex of problems mentioned above—it has been further recognized that the dark noise is caused to a significant degree by defects in the light-sensitive layer of the SPADs. Thus, for example, the situation may arise where a defective SPAD emits an electronic signal even though no light is incident on the light-sensitive region of the diode. The probability of such a false event is referred to as dark count rate, and it should be kept as low as possible.

Since it is not possible for the previously mentioned—larger—detector areas to be produced completely defect-free, in the case of SiPMs, a few improperly functioning SPADs (normally less than 5%) are present, which—regardless of the low number thereof—are responsible for the greatest proportion of the dark noise, due to a not insignificant dark count rate. In this respect, the teaching according to the present invention also relates to a device for detecting light, in particular, for use in a microscope, a spectrometer, or a camera, having at least one silicon photomultiplier (SiPM) that is composed of an array of a plurality of single-photon avalanche diodes (SPADs); per SiPM, those SPADs being deactivated or not analyzed, whose operation is less than satisfactory or faulty and, which, therefore, do not "perform" perfectly. Thus, in a further aspect of the present invention, it has been recognized that the signal-to-noise ratio of the entire array is substantially improved by deactivating individual SPADs having high dark noise levels, even disregarding the respective detection signal of the SPAD, which is faulty and has, therefore, been deactivated in accordance with the present invention.

The less than satisfactory or faulty operation of individual SPADs may be defined by a lower threshold value of the ratio of useful signal to dark noise; it not being a matter of a fixed threshold value in this case.

Test/calibration measurements may be used to ascertain the SPADs which are insufficiently illuminated or whose operation is less than satisfactory or faulty, so that a deactivation of the faulty SPADs over the entire lifetime of the SiPM is possible. In this context, it is also possible to create a type of illumination intensity card, respectively dark noise card of the chip. This is accomplished, for example, by sequentially activating only a portion of the SPADs per pixel, and preferably only one SPAD per pixel at any one time, so that the dark count rate may be assigned to the individual SPADs on the basis of the pixel count rate. To keep the areal proportion of the pixels to be deactivated as small as possible, it may be advantageous to use as many small SPADs as possible, instead of fewer large SPADs per pixel.

It is entirely conceivable that the SPADs to be deactivated are simply "pinched off," so that they do not have any function within the total array of the SiPM.

It is also conceivable that the SPADs to be deactivated are deactivated via a control, preferably by software, obviating the need for any mechanical intervention into the array.

Finally, it is also conceivable that the electrical output signals of the SPADs, which are not to be considered, are disregarded in the analysis of the signals. It is noted here that the aforementioned deactivation, respectively non-consideration methods may be implemented both with regard to the ascertained minimum intensity of the light, as well as with regard to the faulty SPADs.

With regard to the array of the individual SPADs used in forming an SiPM, it is problematic that production engineering constraints necessitate the presence of light-insensitive regions between the individual SPADs and, most notably, also between the individual pixels, namely edge regions of the SPADs and intermediate spaces therebetween. Accordingly, the light-sensitive portion of the entire illuminated area, referred to as fill factor, is considerably less than 100%, typically within the range of between 50% and 70%. A lower photon detection efficiency results therefrom, due, namely, to the light-insensitive regions. To compensate for the low photon detection efficiency associated therewith in comparison to an individual single photon avalanche diode, microlenses, respectively a microlens array adapted to the array of the SPADs may be assigned very advantageously to the SPADs of an SiPM. The microlenses focus the light, which is incident to the total array, at the respective light-sensitive regions of the SPADs; the fill factor being able to be increased by this measure. Depending on the geometry of the incident light, at a given SiPM geometry, it may also be expedient to deactivate individual SPADs that would no longer be struck by the focused light and, in fact, regardless of the provision of microlenses.

In particular, to achieve a simple manufacturing and a compact design of an SiPM, the SPADs may be arranged on a chip, preferably of a silicon substrate. To reduce the dark count rate, the SiPM chip may be cooled, for example, using thermoselective cooling. A cooling to below −40° C. is possible and advantageous.

A use of the device according to embodiments of the present invention in confocal microscopes is especially beneficial; it being a matter therein of the spectrally selective detection, for example, of fluorescent light coming from a sample. It is useful in this case for the device according to the present invention to be designed along the lines of a detector array.

The device according to the present invention may also be used in a spectrometer; in the context of such a use, it being known which diode belongs to the respective desired spectral region. Accordingly, only those pixels may be activated upon which detection light is also actually expected in the particular spectral region.

The use of the device according to the present invention in a camera is also possible, due namely to the previously mentioned properties of an array of SiPMs, composed in each case of arrays of individual SPADs.

With regard to the features of the method, to avoid repetition, reference is made to the explanations regarding the device described above, from which the features relating to the method are derived. Also of importance here is that only those SPADs are activated and/or analyzed, upon which a specific minimum intensity of light also actually impinges. For each SiPM—alternatively or additionally—only those SPADs are activated or not analyzed, whose operation is less than satisfactory or faulty, i.e., which, in any case, do not provide a clean performance.

Based on the example of a confocal scanning microscope, FIG. 1 illustrates the use of a device according to the present invention for detecting light returning from the sample. Specifically, FIG. 1 shows the schematic configuration of a confocal scanning microscope 1, where an array 19 of SPADs 26 is used for detecting the signals from scanning microscope 1. Illuminating light beam 3 coming from a light source 2 is directed by a beamsplitter or a suitable path-folding means 5 to a scanning device 7. Before striking path-folding means 5, illumination light beam 3 passes through an illumination pinhole 6.

In this example, scanning device 7 includes a gimbal-mounted scanning mirror 9, which directs illuminating light beam 3 through a scanning optical system 12 and a microscope optical system 13 over or through an object 15. In the case of non-transparent objects 15, illuminating light beam 3 is guided over the object surface. In the case of biological or transparent objects 15, illuminating light beam 3 may be directed through the object. If indicated, non-luminous preparations are prepared for these purposes using a suitable dye.

The dyes optionally present in object 15 are excited by illuminating light beam 3 and emit light in their own characteristic region of the spectrum. The light emanating from object 15 defines a detection light beam 17. It passes through microscope optical system 15, scanning optical system 12, and via scanning module 7 to path-folding means 5, passing therethrough and, via a detection pinhole 18, to reach array 19. Detection light beam 17 emanating from or defined by object 15 is shown as a dashed line in FIG. 1.

Electrical detection signals that are dependent on the intensity of the light emanating from object 15 are generated in array 19. Since the light emitted by object 15 is not of just one wavelength, it may be expedient to configure a dispersive element 20 upstream of array 19. Dispersive element 20 spectrally splits detection light beam 17, thereby spatially and spectrally separating the individual wavelengths of the detection light. A lens 21, which expands and parallelizes detection light beam 17, may be disposed upstream of dispersive element 20. Moreover, a detector optical system 22, which focuses spectrally separated beams 24, 25 of detection light beam 17 onto array 19, may be disposed downstream of dispersive element 20. Spectrally separated beams 24, 25 differ by wavelength and, therefore, strike different regions on array 19. In the specific embodiment illustrated here, an expanding optical system 23 is provided upstream of dispersive element 20. Expanding optical system 23 may be designed in such a way that the numerical aperture of detector optical system 22 is independent of the numerical aperture of detection light beam 17 incident on detection pinhole 18.

Figure 2:
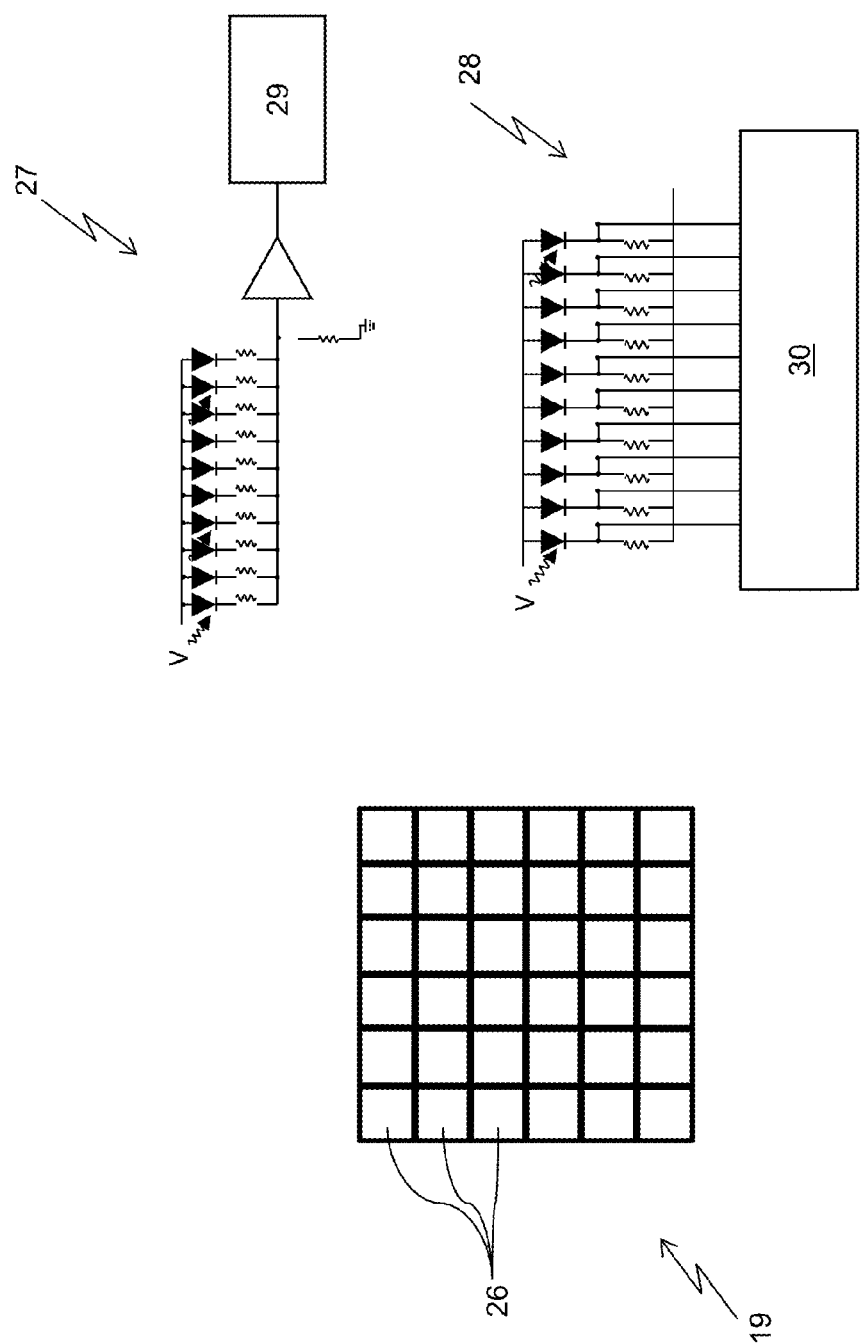
FIG. 2 shows a schematic view of the basic configuration of an array according to the present invention including SPADs and the option relating thereto for analog or digital circuitry/evaluation.

In a schematic view, FIG. 2 shows the basic configuration of an array 19 of a device according to the present invention, array 19 including a plurality of SPADs 26. Together, SPADs 26 form SiPM 19; in this exemplary embodiment, for one pixel.

Moreover, FIG. 2 shows the basic circuitry of SiPM 19, respectively of SPAD 26 in the case of analog evaluation 27 and digital evaluation 28; during analog evaluation 27, the signal being fed to an AD converter 29 and to a corresponding evaluation. During digital evaluation 28, the signals are fed to a digital evaluation logic 30 (on-chip read out). In this context, SPADs 26 are individually addressable.

Figure 3:
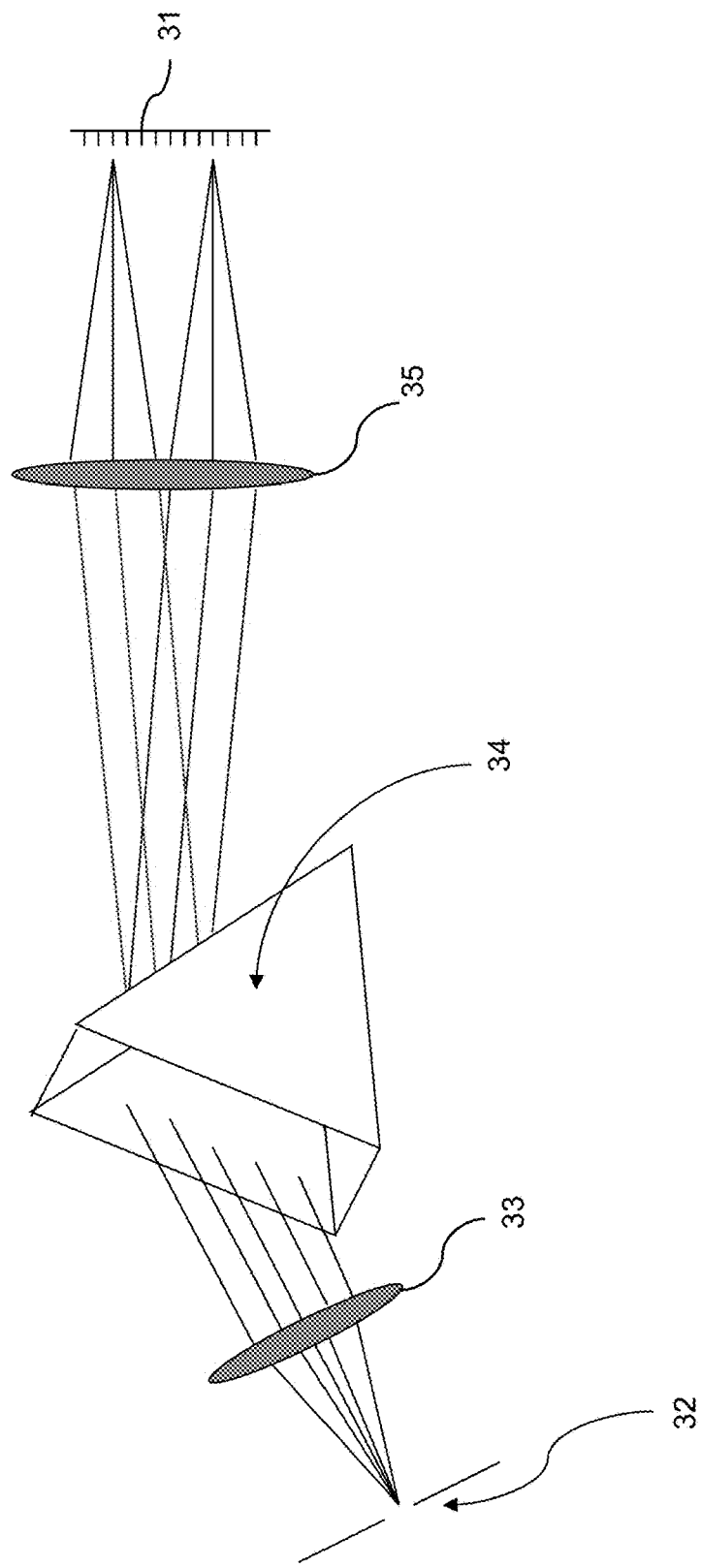
FIG. 3 shows a schematic view of the basic configuration of a spectrometer including a device according to the present invention as a detector array.

FIG. 3 shows a basic spectrometer configuration, the light to be detected being parallelized downstream of an aperture/pinhole 32 by an optical system 33 and spectrally split by a dispersive element, for example, a prism, grating 34 or a hologram. Via a further optical system 35, the spectrally split light reaches a detector array 31 that is designed as a multipixel array having a plurality of SiPMs, composed of SPADs.

FIG. 4 shows possible arrangements of SiPMs 19, each composed of arrays of SPADs 26. SiPMs 19 may, for example, be configured in a matrix-type array for use in a camera (FIG. 4a). SiPMs 19 may be linearly arrayed (FIG. 4b) for use in a spectrometer. In each of the two cases, 16 pixels are illustrated, respectively depicted. Other pixel numbers and pixel arrays are possible in light of the present invention.

FIG. 5a illustrates the use of conventional photomultipliers 36, for example, in confocal microscopy, detection light 37 there reaching particular intended photomultipliers 36 via various dichroic beamsplitters 38 to allow detection of specific spectral regions.

FIG. 5b shows the replacement of the conventional photomultipliers by arrays of SPADs 26, it being possible for microlenses to be assigned to SPADs 26. Here as well, via dichroic beamsplitters 38, the detection light reaches detectors, in these cases, the arrays of SPADs 26, namely the various SiPMs 19 which include the SPAD arrays.

Figure 6B:
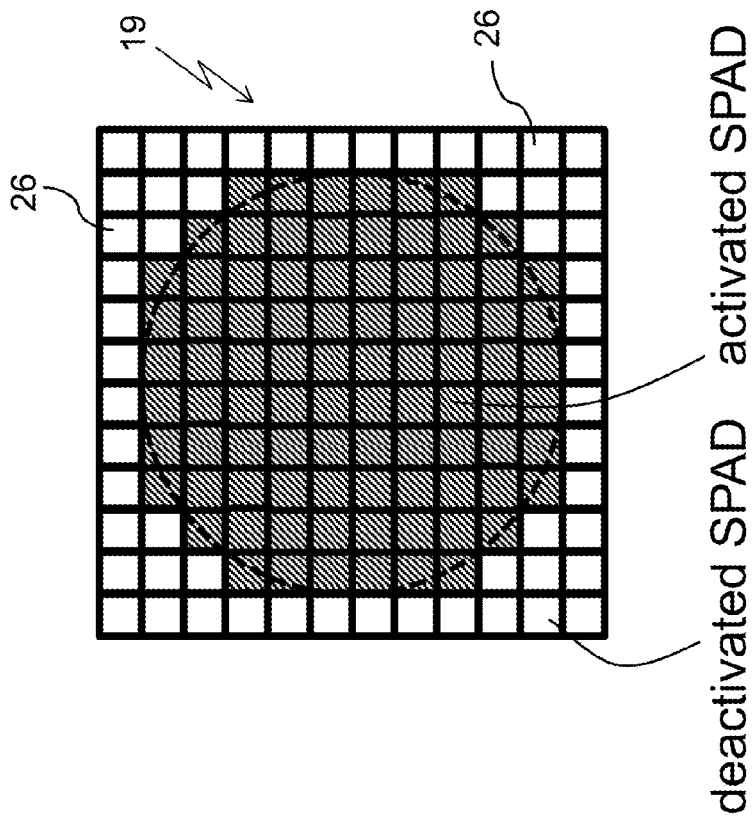
FIG. 6 shows schematic views of the light distribution (FIG. 6a) and the activation/deactivation of individual SPADs (FIG. 6b)
Figure 6A:
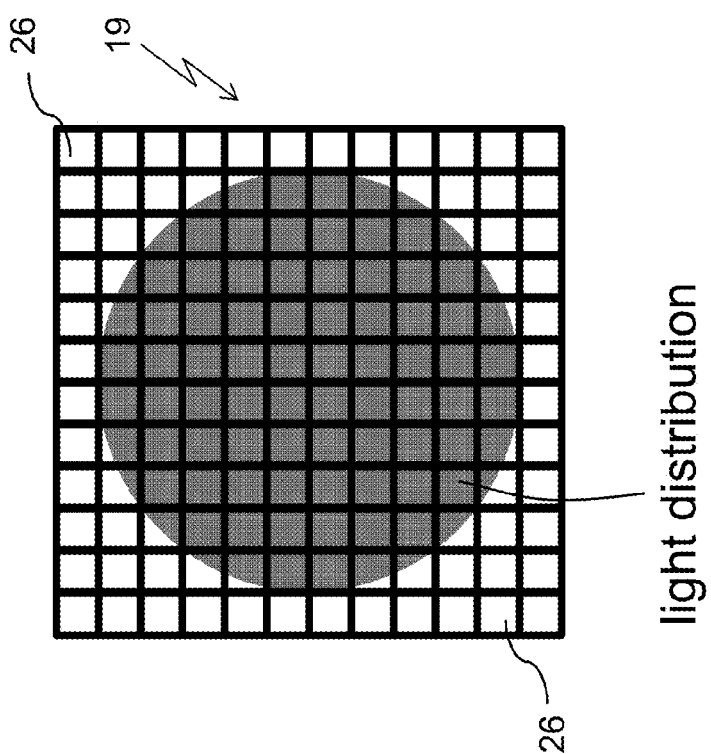

In a schematic view, FIG. 6 shows the array of SPADs 26, which, together, form an SiPM 19. Specifically, the light distribution is indicated in FIG. 6a. SPADs 26 may feature a distance (subpixel distance) of 50 μm×50 μm, the pixel size being somewhat smaller, due, namely, to the interpixel distance. The photosensitive area may include 40×40 subpixels, for example, this corresponding to the size of a photosensitive area in the range of 2 mm×2 mm.

FIG. 6b indicates which SPADs 26 are activated, respectively deactivated in accordance with the inventive teaching. SPADs 26 located within the indicated circle and SPADs 26 intersected by the circumference of the circle are activated. SPADs 26 located outside of the circle, respectively not in contact with those within the circle are deactivated, as is claimed by the inventive teaching.

Figure 7B:
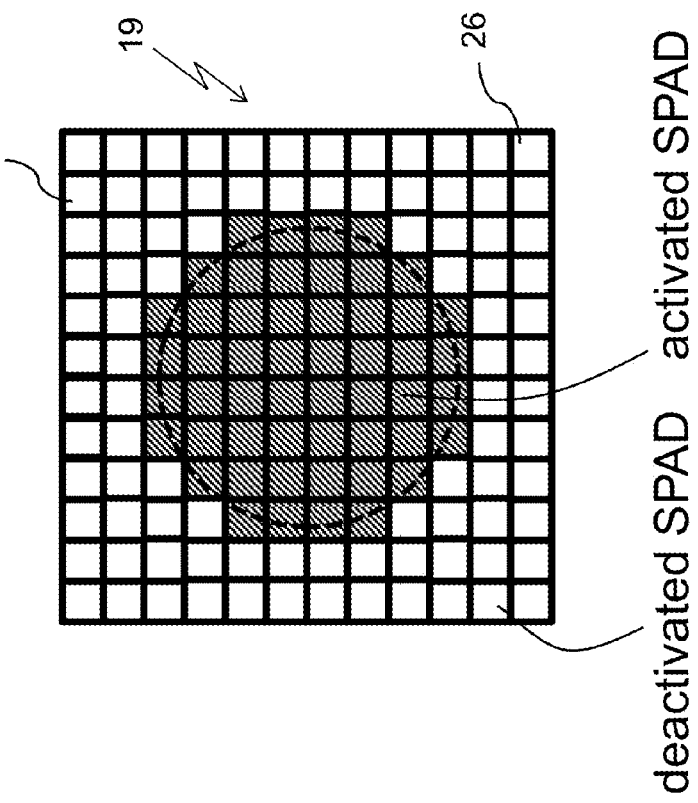
FIG. 7 shows schematic views of the light distribution (FIG. 7a) and the activation/deactivation of individual SPADs (FIG. 7b), including a smaller light spot in comparison with the representation in FIG. 6.
Figure 7A:
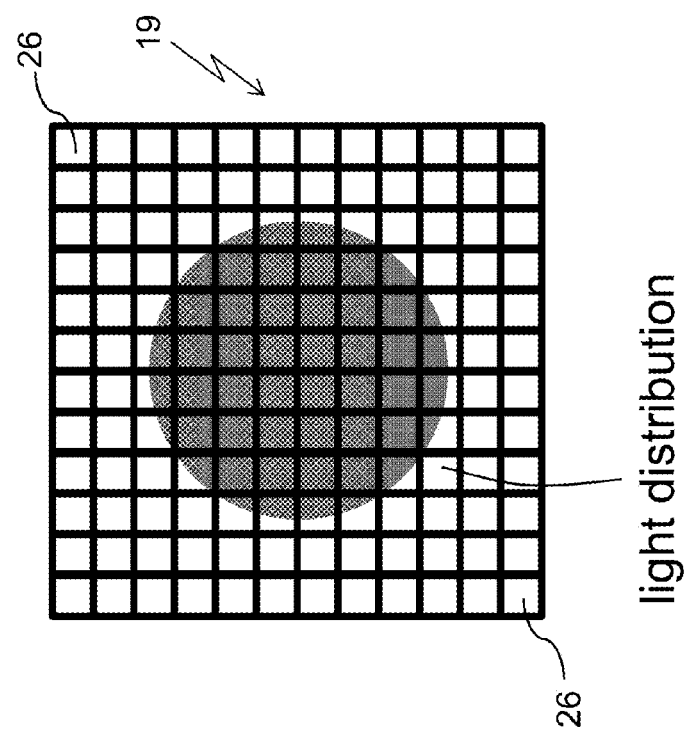

FIG. 7 shows the same array as in FIG. 6, however, with a smaller light spot, resulting from a smaller pinhole size. FIG. 7a shows the basic light distribution, and FIG. 7b the ratio of activated to deactivated SPADs 26.

In accordance with the representation in FIG. 5, FIG. 8 shows, on the one hand, the basic array in the case of what is known as an SP detector having a variable aperture; FIG. 8a indicating the conventional use of photomultipliers 36, while FIG. 8b shows the use of arrays of SPADs 26, namely SiPMs 19, these being able to be equipped, in turn, with or without microlenses.

Detection light 37 passes an optical system 33 and a prism 39, is split accordingly—by variable slit or pinhole apertures 40—and beamsplitters to reach photomultipliers 36. In accordance with FIG. 8b, the photomultipliers are replaced by arrays of SPADs 26, namely by arrays of SiPMs 19.

Figure 9B:
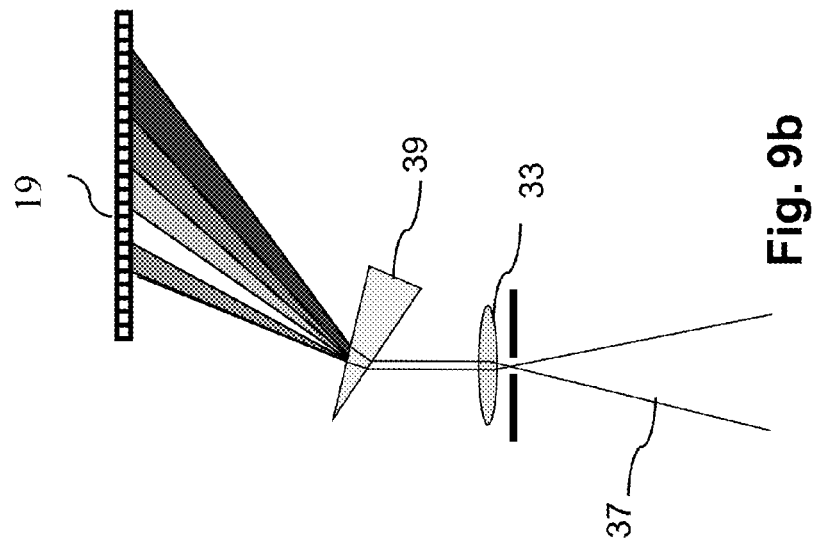
FIG. 9 shows schematic views of the use of SPAD arrays as a replacement for conventional photomultipliers when working with what are known as SP detectors having a variable aperture; related-art photomultipliers being replaced by an array of SPADs.
Figure 9A:
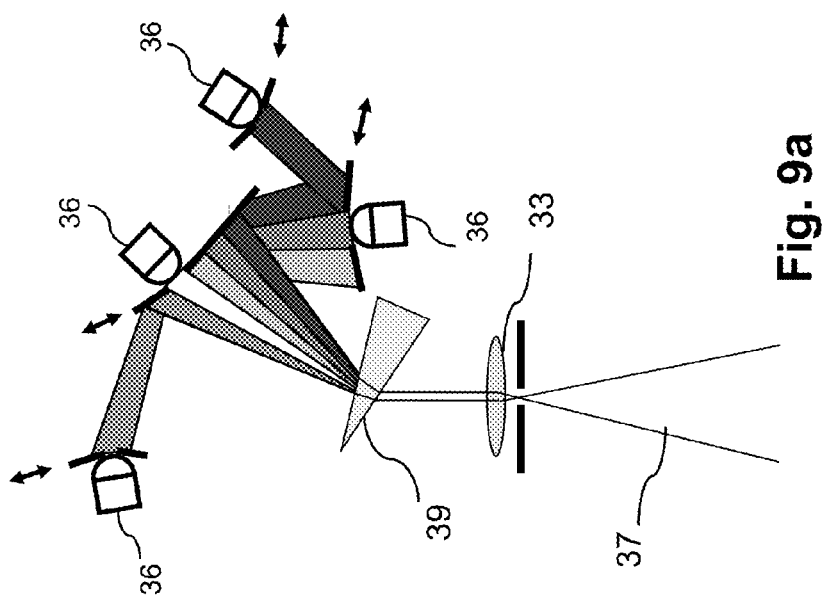

FIG. 9a illustrates the related art in so far as photomultipliers 36 therein are used along with variable slit or pinhole apertures 40. In accordance with FIG. 9b, they are replaced by an array 19 of SPADs 26. Detection light 37 passes accordingly through an optical system 33 and a prism 39 to reach the array (SiPM) composed of individual SPADs 26.

The array of SPADs corresponding to the representation in FIG. 8b is shown in detail in FIG. 10; SPADs 26 therein collectively forming a single-pixel SiPM 19.

FIG. 10a again shows the light distribution. FIG. 10b schematically illustrates the activation and deactivation of individual SPADs 26 by the indicated circle.

It is noted here that the array of SPADs 26 shown in FIG. 10 serves as a replacement for individual photomultipliers 36, namely in the context of what is known as an SP detector for detection of light of variable bandwidth. FIG. 10 shows an array of SPADs for detecting a first detection wavelength in the context of a use in accordance with FIG. 8.

Figure 11B:
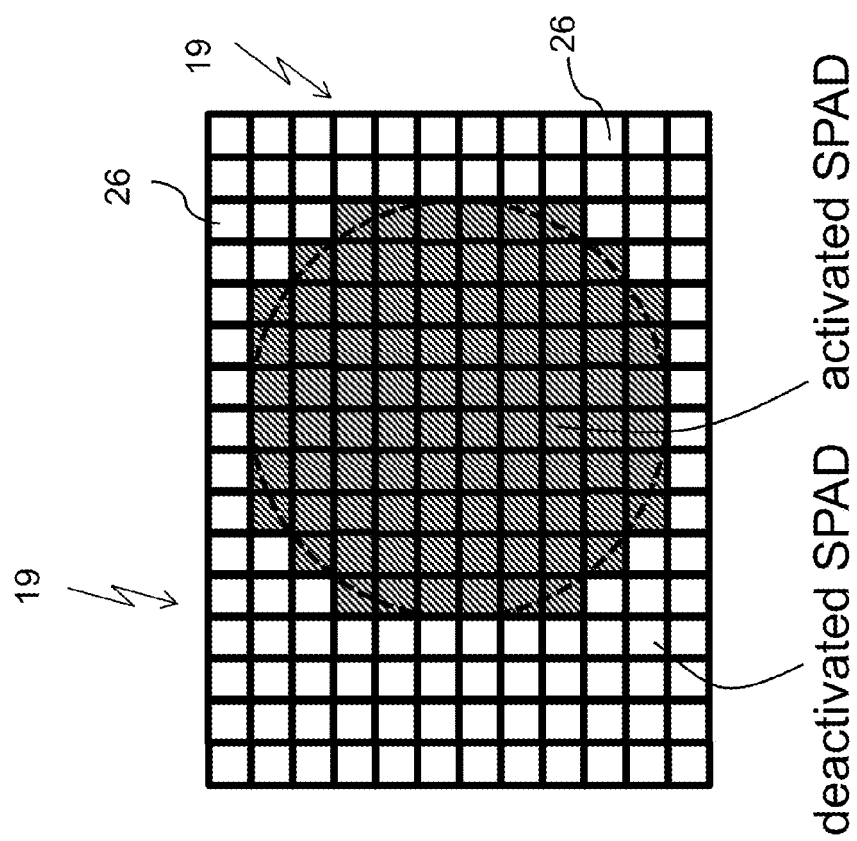
FIG. 11 shows schematic views of the light distribution (FIG. 11a) and the activation/deactivation of individual SPADs (FIG. 11b) in comparison to the representation in FIG. 10 for a different detection wavelength.
Figure 11A:
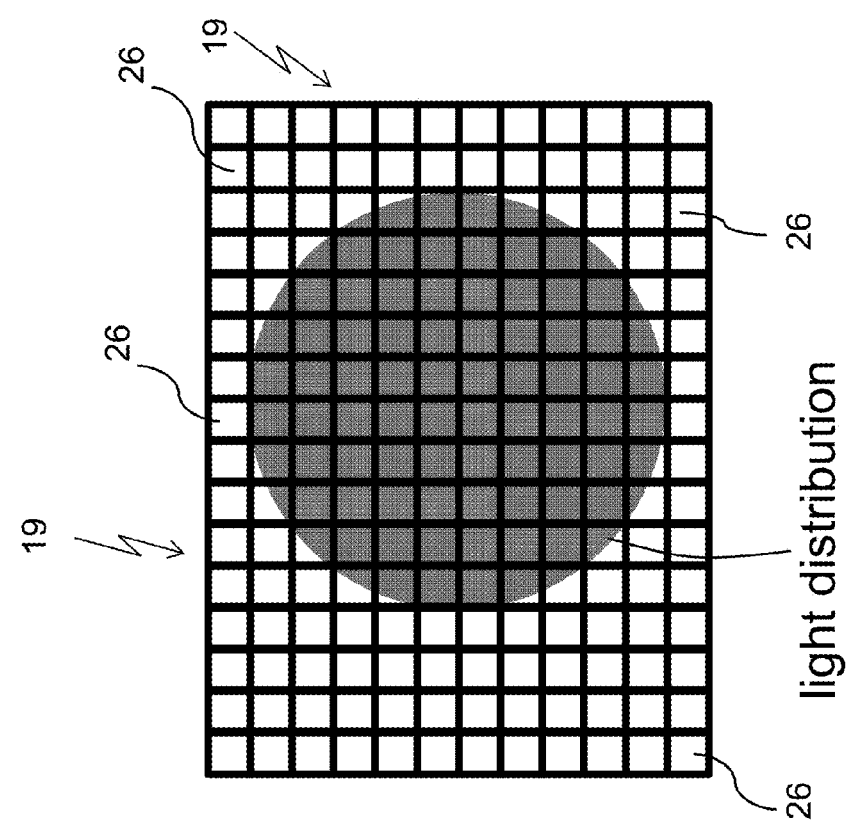

FIG. 11 shows a corresponding array of SPADs 26, namely, on the one hand, the light distribution, in turn, and, on the other hand, the activation and deactivation of individual SPADs 26, here, however, with regard to a second detection wavelength in the context an application using an SP detector in accordance with the representation in FIG. 8.

FIG. 12 shows the basic configuration of an array of SiPMs 19, each SiPM including, in turn, a plurality of SPADs 26. Specifically, FIG. 12a illustrates the light distribution for a corresponding spot in the context of a spectrometer as shown in FIG. 9b. FIG. 12b shows the deactivation and activation of an SPAD in accordance with the light distribution.

FIG. 13 shows the basic configuration of an array of SiPMs 19 in accordance with FIG. 12, however, having a different light distribution, resulting from a different wavelength, for example, that of fluorescent light.

The basic configuration shown FIG. 14 is comparable to that in FIGS. 12 and 13, the light distribution of the fluorescent light again being different. In the representation in FIG. 14a, illuminating light 41 of interest for the evaluation and stray light impinge on the array of SiPMs 19. Individual SPADs 26 are deactivated, on the one hand, due to the stray light and, on the other hand, due to the lack of illumination. Activated SPADs 26 are used for the evaluation.

When used in a spectrometer, specifically that wavelength range in the spectrometer is deactivated in which unwanted stray light, such as reflected or stray light of the excitation laser wavelengths, strikes. If indicated, adjacent ranges are also deactivated due, namely, to what is known as crosstalk. The deactivation of these ranges is particularly important since the stray light is generally much higher in intensity than the useful light (fluorescent light). Since the light distribution of the useful light is dependent on the fluorophores used by the user, all SPADs, respectively pixels are activated upon which no excitation light impinges (provided that they are not defective or dark noise pixels as previously described), so that detection is possible independently of the fluorophores used. Any interference by excitation light is ruled out. In the same way, excitation may be carried out using a plurality of laser lines; a plurality of ranges then being blocked accordingly.

In the context of the representation of FIG. 14, there are three reasons for deactivating individual SPADs, respectively subpixels, namely, only when an insufficient amount of illumination light impinges on the SPADs, respectively subpixels, when the performance of individual SPADs, respectively subpixels is less than satisfactory or poor (dark noise or the like), or when stray light strikes the SPADs, respectively subpixels.

FIG. 15 shows the configuration of a plurality of SiPMs in the sense of a matrix-type array 19, each SiPM 19 being composed of a plurality of SPADs 26. Defective, respectively less than satisfactorily performing SPADs 26, which cause high dark noise levels, are deactivated.

Figure 16:
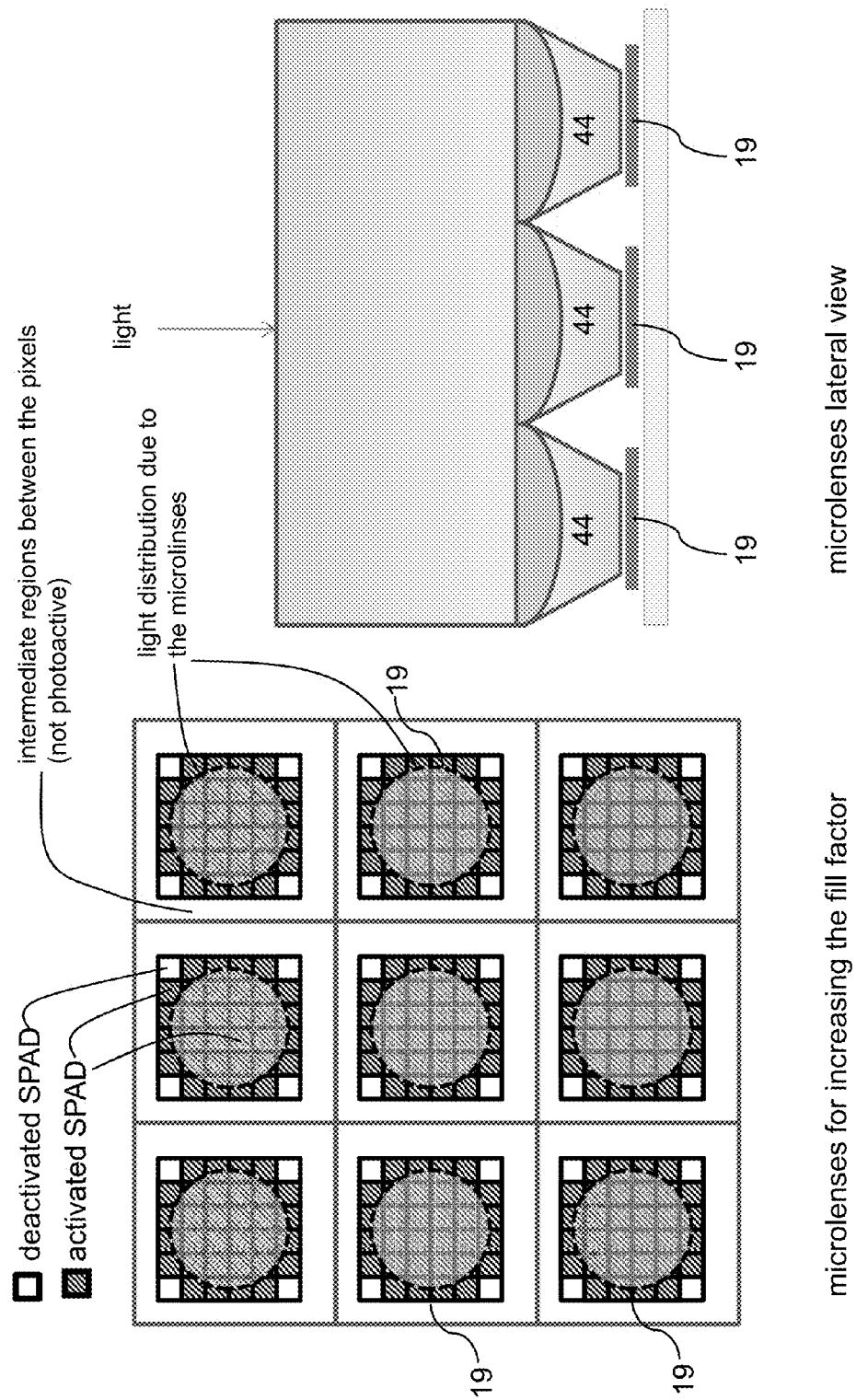
FIG. 16 shows a schematic view of matrix-like arrayed SiPMs, microlenses being provided there to facilitate light distribution.

Finally, FIG. 16 shows the configuration of a plurality of SiPMs 19, composed in each case of a plurality of SPADs 26 on one chip. Due to the unusable intermediate regions 43, microlenses 44, shown in a lateral view in FIG. 16, are assigned to the arrays of SiPMs 19. Using microlenses 44, a more favorable light distribution is derived, in each instance, focused at the usable regions of SiPMs 19.

Moreover, FIG. 16 shows the deactivated SPADs, upon which no detection light impinges.

With regard to other features that are not inferable from the figures and to avoid repetition, reference is made to the general portion of the Specification and to the appended claims.

It is finally noted, in particular, that the above described exemplary embodiments of the device according to the present invention merely serve to exemplify the claimed teaching, but not to limit it thereto.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 1 confocal scanning microscope
2 light source
3 illuminating light beam
5 path-folding means
6 illumination pinhole
7 scanning device
9 scanning mirror
12 scanning optical system
13 microscope optical system
15 object
17 detection light beam
18 detection pinhole
19 array, SiPM
20 dispersive element
21 lens
22 detector optical system
23 expanding optical system
24 beams
25 beams
26 SPAD
27 analog evaluation
28 digital evaluation
29 A/D converter
30 digital evaluation logic
31 detector array
32 aperture/pinhole
33 optical system
34 prism/grating
35 optical system
36 photomultiplier
37 detection light
38 dichroic beamsplitter
39 prism
40 variable pinhole aperture
41 illuminating light
42 stray light
43 intermediate region
44 microlens

What is claimed is:

1. A device for detecting light comprising:
at least one silicon photomultiplier (SiPM) including an array of a plurality of single-photon avalanche diodes (SPADs), and
a detector optical system configured to provide an incident light on the array in expected areas thereof, the array being larger in area than the incident light, the device being configured so as to at least one of activate and analyze only the SPADs in the expected areas upon which a specific minimum intensity of light impinges.

2. The device recited in claim 1, wherein the device is configured for use in a microscope, spectrometer or camera.

3. The device recited in claim 1, wherein the at least one silicon photomultiplier includes an array of a plurality of silicon photomultipliers (SiPM), each SiPM including an array of single-photon avalanche diodes (SPADs), each array of SPADs being larger in area than a respective incident light, and being configured so as to at least one of activate and analyze only the SPADs upon Which a respective specific minimum intensity of light impinges.

4. The device recited in claim 1, wherein the minimum intensity of light is based on at least one test measurement.

5. The device recited in claim 1, wherein the device is configured to deactivate or not analyze the SPADs having an operation that is less than satisfactory or faulty.

6. The device recited in claim 5, wherein the less than satisfactory or faulty SPADs are defined based on a lower threshold value of a ratio of useful signal to dark noise.

7. The device recited in claim 5, wherein the device is configured to deactivate the SPADs that are less than satisfactory or fault over a lifetime of the SiPM based on at least one of test and calibration measurements.

8. The device recited in claim 7, wherein the deactivated SPADs are pinched off.

9. The device recited in claim 7, wherein the deactivated SPADs are deactivated by a control.

10. The device recited in claim 1, wherein electrical output signals of the SPADs that are not at least one of activated and analyzed are disregarded in an evaluation of signals of the SPADs.

11. The device recited in claim 1, further comprising a microlens assigned to each individual SPADs, the microlenses forming a microlens array.

12. The device recited in claim 1, wherein the array of SPADs of each of the at least one SiPM are arranged on a chip.

13. The device recited in claim 12, wherein the chip is thermoelectrically cooled.

14. An apparatus comprising:
a device for detecting light including at least one silicon photomultiplier (SiPM) including an array of a plurality of single-photon avalanche diodes (SPADs) and
a detector optical system configured to provide an incident light on the array in expected areas thereof, the array being larger in area than the incident light, the device being configured so as to at least one of activate and analyze only the SPADs in the expected areas upon which a specific minimum intensity of light impinges.

15. The apparatus recited in claim 14, wherein the apparatus is a microscope and the device is configured to detect light returning from a sample.

16. The apparatus recited in claim 14, wherein the apparatus is a spectrometer and the device is configured to detect spectral regions of light.

17. The apparatus recited in claim 14, wherein the apparatus is a camera and the device is configured to capture light for producing images.

18. A method for detecting light, the method comprising:
providing a device for detecting light including at least one silicon photomultiplier (SiPM) having an array of a plurality of single-photon avalanche diodes (SPADs), the array being larger in area than an incident light; and
providing the incident light on the array in expected areas and, based thereon, at least one of:
activating only the SPADs in the expected areas upon which a specific minimum intensity of light impinges,
analyzing only the SPADs in the expected areas upon which the specific minimum intensity of light impinges,
deactivating the SPADs in the expected areas whose operation is less than satisfactory or faulty, and
not analyzing the SPADs in the expected areas whose operation is less than satisfactory or faulty.

19. The method recited in claim 18, wherein the minimum intensity of the incident light is based on at least one test measurement.

20. The method recited in claim 18, wherein a determination of the operation of a SPAD being less than satisfactory or faulty is based on a test or calibration measurement, and further comprising deactivating the less than satisfactory or faulty SPAR over a lifetime of the SiPM.

21. The method recited in claim 18, wherein a determination of the operation of a SPAR being less than satisfactory or faulty is based on a dark count rate assigned to the respective SPAD on the basis of a pixel count rate.

* * * * *